United States Patent [19]

Dunnavant et al.

[11] Patent Number: 4,602,069

[45] Date of Patent: Jul. 22, 1986

[54] PHENOLIC RESIN-POLYISOCYANATE BINDER SYSTEMS CONTAINING A PHOSPHORUS BASED ACID

[75] Inventors: William R. Dunnavant, Columbus; John J. Gardikes, Worthington; Heimo J. Langer, Columbus, all of Ohio

[73] Assignee: Ashland Oil, Inc., Ashland, Ky.

[21] Appl. No.: 599,106

[22] Filed: Apr. 11, 1984

[51] Int. Cl.$^4$ .................. C08G 8/28; C08G 8/32; C08G 18/54; C08G 18/83

[52] U.S. Cl. .................. 525/504; 523/141; 523/143; 523/343; 524/115; 524/142; 524/313; 524/442; 524/541; 524/589; 524/590; 524/595; 528/158; 528/51; 164/16; 164/21; 164/525; 164/526; 164/527

[58] Field of Search ............... 525/504; 528/158, 51; 164/525, 21, 16, 526, 521, 527; 524/115, 142, 313, 442, 541, 143, 141, 323–343, 589, 590, 595

[56] References Cited

U.S. PATENT DOCUMENTS

| Number | Date | Name | Ref |
|---|---|---|---|
| 2,692,873 | 10/1954 | Langerak et al. | |
| 3,087,912 | 4/1963 | Wagner et al. | 525/504 X |
| 3,144,419 | 8/1964 | Guttag | |
| 3,179,625 | 4/1965 | Ehrhart | |
| 3,245,922 | 4/1966 | Worsley et al. | 525/504 X |
| 3,377,317 | 4/1968 | Hoxie | 528/158 X |
| 3,384,606 | 5/1968 | Dieterich et al. | 525/504 X |
| 3,409,579 | 11/1968 | Robins | |
| 3,429,848 | 2/1969 | Robins | 525/504 X |
| 3,468,819 | 9/1969 | Szabat | 528/51 X |
| 3,476,696 | 11/1969 | Quinn | 525/504 X |
| 3,485,797 | 12/1969 | Robins | |
| 3,497,465 | 2/1970 | Kujawa et al. | 528/51 X |
| 3,527,725 | 9/1970 | Strauss et al. | |
| 3,676,392 | 7/1972 | Robins | |
| 3,686,101 | 8/1972 | Davis et al. | 525/504 X |
| 3,900,686 | 8/1975 | Ammons et al. | 528/51 X |
| 3,905,934 | 9/1975 | Gardikes | |
| 3,943,075 | 3/1976 | Fishbein et al. | |
| 4,024,113 | 5/1977 | Ammons | |
| 4,079,031 | 3/1978 | Sardessai et al. | 525/504 X |
| 4,101,529 | 7/1978 | Ammons | |
| 4,116,916 | 9/1978 | Holik | 525/504 X |
| 4,131,605 | 12/1978 | Ammons | |
| 4,131,606 | 12/1978 | Ammons | |
| 4,160,853 | 7/1979 | Ammons | |
| 4,241,140 | 12/1980 | Ammons | |
| 4,246,157 | 1/1981 | Laitar | |
| 4,268,425 | 5/1981 | Gardikes | |
| 4,311,815 | 1/1982 | Heine | 525/504 |
| 4,358,570 | 11/1982 | Tobinaga | 525/504 X |
| 4,361,692 | 11/1982 | Ammons | 528/51 |
| 4,436,881 | 3/1984 | Laitar | |
| 4,540,724 | 9/1985 | Dunnavant et al. | 523/143 |

*Primary Examiner*—Howard E. Schain
*Attorney, Agent, or Firm*—Pollock, Vande Sande & Priddy

[57] ABSTRACT

A binder composition containing a phenolic resin, a polyisocyanate, a phosphorus based acid and optionally an acid halide and/or a base, and methods of making and using the same.

57 Claims, No Drawings

PHENOLIC RESIN-POLYISOCYANATE BINDER SYSTEMS CONTAINING A PHOSPHORUS BASED ACID

TECHNICAL FIELD

The present invention relates to binder compositions, and methods for making, curing and using such binder compositions. The binder compositions of the present invention are especially useful as molding compositions such as for making refractory and/or abrasive articles, and for molding shapes such as cores and molds. The preferred binder compositions of the present invention are especially useful in obtaining foundry shapes which exhibit improved bench life. The binder compositions are capable of being cured at room temperature, by a gaseous curing agent.

BACKGROUND OF THE INVENTION

U.S. Pat. Nos. 3,409,579 and 3,676,392 disclose binder compositions made available as two-package systems comprising a resin component in one package and a hardener component in the other package. The entire contents of each of these two U.S. patents are incorporated herein by reference. The resin component comprises an organic solvent solution of phenolic resin. The hardener component comprises a liquid polyisocyanate having at least two isocyanate groups per molecule. At the time of use, the contents of the two packages may be combined first and then mixed with the sand aggregate, or preferably the packages are sequentially admixed with sand aggregate. After a uniform distribution of the binder on the sand particles has been obtained, the resulting foundry mix is molded into the desired shape.

In U.S. Pat. No. 3,409,579, the molded shape is cured by passing a gaseous tertiary amine through it. In U.S. Pat. No. 3,676,392, curing is effected by means of a base having a pKb value in the range of about 7 to about 11 as determined by a method described by D. D. Perrin in Dissociation Constants of Organic Bases in Aqueous Solution (Butterworths, London 1965). The base is introduced originally into the resin component before it is mixed with hardener, or it may be introduced as the third component of a three-package binder system comprising in separate packages the resin component, the hardener, and the base.

In both U.S. Pat. Nos. 3,409,579 and 3,676,392, the preferred phenolic resins contain benzylic ether resins along with other reaction products. Benzylic ether resins are condensation products of a phenol having the general formula:

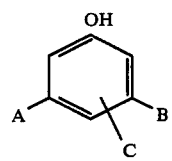

wherein A, B, and C are hydrogen, hydrocarbon radicals, oxyhydrocarbon radicals, or halogen, with an aldehyde having the general formula R'CHO wherein R' is a hydrogen or a hydrocarbon radical of 1 to 8 carbon atoms, prepared in the liquid phase at temperatures below about 130° C. in the presence of catalytic concentrations of a metal ion dissolved in the reaction medium. The preparation and characterization of these resins is disclosed in greater detail in U.S. Pat. No. 3,485,797, the entire contents of which is incorporated herein by reference. The phenolic resin component of the binder composition is, as indicated above, generally employed as a solution in an organic solvent.

The second component or package of the binder composition comprises an aliphatic, cycloaliphatic, or aromatic polyisocyanate having preferably from 2 to 5 isocyanate groups. If desired, mixtures of polyisocyanates can be employed. Less preferably, isocyanate prepolymers formed by reacting excess polyisocyanate with a polyhydric alcohol, e.g., a prepolymer of toluene diisocyanate and ethylene glycol, can be employed. Suitable polyisocyanates include the aliphatic polyisocyanates such as hexamethylene diisocyanate, alicyclic polyisocyanates such as 4,4'-dicyclohexylmethane diisocyanate, and aromatic polyisocyanates such as 2,4- and 2,6-toluene diisocyanate, diphenylmethane diisocyanate, and dimethyl derivatives thereof. Further examples of suitable polyisocyanates are 1,5-naphthalene diisocyanate, triphenylmethane triisocyanate, xylylene diisocyanate, and the methyl derivatives thereof, polymethylenepolyphenyl isocyanates, chlorophenylene-2,4-diisocyanate, and the like. Although all polyisocyanates react with the phenolic resin to form a cross-linked polymer structure, the preferred polyisocyanates are aromatic polyisocyanates and particularly diphenylmethane diisocyanate, triphenylmethane triisocyanate, and mixtures thereof.

The polyisocyanate is employed in sufficient concentrations to cause the curing of the phenolic resin. In general, the polyisocyanate will be employed in a range of 10 to 500 weight percent of polyisocyanate based on the weight of the phenolic resin. Preferably, from 20 to 300 weight percent of polyisocyanate on the same basis is employed. The polyisocyanate is employed in liquid form. Liquid polyisocyanates can be employed in undiluted form. Solid or viscous polyisocyanates are employed in the form of organic solvent solutions, the solvent being present in a range of up to 80% by weight of the solution.

The bench life of an aggregate binder can be defined as the maximum permissible time delay between mixing the binder components together with an aggregate such as sand and the production of acceptable products therefrom by curing. In order to extend the bench life of the above binder systems before they are contacted with the catalytic component, various materials have been suggested. Phthaloyl chloride is currently being commercially employed for such purpose but is not entirely satisfactory because of life shortening effects of moisture and/or elevated temperatures and/or impurities on the sand. Although great improvements in bench life have been obtained through the use of phosphorus halides as described in copending application Ser. No. 575,208, now U.S. Pat. No. 4,540,724, such halides are relatively expensive and/or may produce an unpleasant odor.

DISCLOSURE OF THE INVENTION

The present invention in the use of phosphorus based acids alone or in combination with acid halides provides for improved bench life of molding compositions as compared to the use of the commercially employed phthaloyl chloride. The improved bench life provided by the present invention is equal to or greater than that provided by the phosphorus halides of the related application referred to above. In addition, the compositions exhibit satisfactory strength characteristics.

The present invention is concerned with a binder composition which comprises a resin component, a hardener component and a phosphorus based acid. Optionally, an acid halide also may be included in the composition. The composition is cured by contacting it with a catalyst for the hardening or cross-linking reaction. The curing catalyst is preferably a gaseous tertiary amine.

The phenolic resin component includes a phenolic resin which comprises reaction products of a phenol with an aldehyde. This phenol has the general formula:

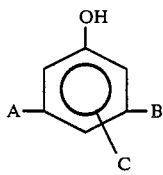

wherein A, B and C are hydrogen atoms, or hydroxyl radicals, or hydrocarbon radicals, or oxyhydrocarbon radicals, or halogen atoms, or combinations of these. This phenol may be a multiple ring phenol such as bisphenol A. Preferably at least about 5 mole percent, more preferably about 5 to about 30 mole percent, of the phenol reactants employed in making the phenolic resin component is a substituted phenol such as an alkyl phenol, more preferably nonyl phenol, most preferably para-nonyl phenol. The phenolic resin is preferably non-aqueous. By "non-aqueous" is meant a phenolic resin which contains water in amounts of no more than about 10%, preferably no more than about 5%, and more preferably no more than about 1% based on the weight of the resin. The phenolic resin component preferably includes benzylic ether resins.

The aldehyde has the formula R'CHO wherein R' is a hydrogen or hydrocarbon radical of 1 to 8 carbon atoms. The hardener component comprises liquid polyisocyanate containing at least two isocyanate groups per molecule.

By "phenolic resin" is meant the reaction products of a phenol with an aldehyde in which the final mixture of molecules in the reaction products is dependent upon the specific reactants selected, the starting ratio of these reactants, and the conditions of the reaction (for example, the type of catalyst, the time and temperature of the reaction, the solvents and/or other ingredients present, and so forth). The reaction products, that is, the phenolic resin, will be a mixture of different molecules and may contain in widely varying ratios addition products, condensation products, and unreacted reactants such as unreacted phenol and/or unreacted aldehyde. By "addition product" is meant reaction products in which an organic group has been substituted for at least one hydrogen of a previously unreacted phenol or of a condensation product. By "condensation product" is meant reaction products with two or more benzene rings.

By "phosphorus based acid" is meant metaphosphoric, hypophosphoric, orthophosphoric, pyrophosphoric or polyphosphoric acid; or phosphorous, hypophosphorous or pyrophosphorous acid; or an organic derivative of these inorganic phosphorus acids other than completely esterified derivatives which have no free hydroxyl group attached to the phosphorus atom. By "organic derivative" is meant the substitution of at least one organic group for at least one of the hydrogen atoms of these inorganic phosphorus acids. The preferred phosphorus based acids are orthophosphoric, pyrophosphoric, phosphorous and hypophosphorous acids, and the partial esters of orthophosphoric and pyrophosphoric acids such as monophenyl and diphenyl acid phosphates, monobutyl and dibutyl acid phosphates, monoisooctyl and diisooctyl acid phosphates, mono(2-ethylhexyl) and di(2-ethylhexyl) acid phosphates, and bis(2-ethylhexyl) pyrophosphoric acid. A mixture of monophenyl and diphenyl acid phosphates, such as PA-75 available from Mobile Oil Company (75% by weight in butyl alcohol), is more preferred.

By "acid halide" is meant a hydrogen halide acid or a halogenated compound that will produce a hydrogen halide acid in the presence of water. Such compounds include hydrogen chloride, acid chlorides of organic acids including carboxylic and sulfonic acids, chlorosilanes, chloroformates, and phosphorus chlorides such as those described in U.S. application Ser. No. 575,208 filed on Jan. 30, 1984, the entire contents of this application being incorporated herein by reference.

In the two component systems described, the phosphorus based acid may be dissolved in either the phenolic or isocyanate component. The acid halide is generally dissolved in the isocyanate component. Alternatively, either the phosphorus based acid or the acid halide or both may comprise a third component separately packaged so as to be mixed with the other components just prior to or during admixture with an aggregate, such as sand. The placement of the phosphorus or halide ingredient in a given component of the system depends on its solubility and stability in that component. The solubility should be such that the ingredient does not separate out upon prolonged standing in storage. The stability should be such that the ingredient does not cause any adverse or premature reaction with the other constituents of the component. For example, an ingredient that contains or reacts to produce water molecules should not be placed in the component with isocyanates which undergo a cross-linking reaction with water.

When the phosphorus based acid is placed with the phenolic resin component, stability may be improved by neutralizing the acid with a base, such as a primary amine, secondary amine or tertiary amine, or mixtures thereof. Suitable amines, which also may improve the humidity resistance of the system, are the aminosilanes.

The present invention is also concerned with molding compositions which comprise a major amount of aggregate; and an effective bonding amount of up to about 40% by weight of the binder composition described hereinabove based on the weight of aggregate.

Moreover, the present invention is concerned with fabricating foundry shapes which comprises mixing foundry aggregate with a bonding amount of up to about 10% by weight of the binder composition described hereinabove based upon the weight of the aggregate. The foundry mix is introduced in a pattern and hardened to become self-supporting. The shaped foundry mix is removed from the pattern and allowed to further cure to thereby obtain a hard, solid, cured foundry shape.

Furthermore, the present invention is concerned with a process for casting a metal. The process comprises fabricating a foundry shape as discussed hereinabove and pouring the metal while in the liquid or molten state into or around the shape. The metal is allowed to cool and solidify and the molded metal article is then separated from the foundry shape.

BEST AND OTHER MODES FOR CARRYING OUT THE INVENTION

The phosphorus based acid employed according to the present invention can be an inorganic phosphorus acid or an organic derivative of an inorganic phosphorus acid other than completely esterified derivatives which have no free hydroxyl groupd attached to the phosphorus atoms. The preferred phosphorus based acids are orthophosphoric, pyrophosphoric, phosphorous and hypophosphorous acids, and the partial esters of orthophosphoric and pyrophosphoric acids such as monophenyl and diphenyl acid phosphates, monobutyl and dibutyl acid phosphates, monisooctyl and diisooctyl acid phosphates, mono(2-ethylehexyl) and di(2-ethylhexyl) acid phosphates and bis(2-ethylehexyl) pyrophosphoric acid. Mixtures of phosphorus based acids also can be used as desired.

The acid halides employed according to the present invention can be hydrogen halide acids such as hydrogen chloride or hydrogen bromide, or a halogenated organic compound that will in the presence of water form the corresponding hydrogen halide acid and organic acid. The preferred acid halides are hydrogen chloride and phthaloyl chloride. Other suitable acid halides include chlorosilanes such as dimethyl- and trimethylchlorosilane, dichlorodiphenyl- and dichloromethylvinyl silane; thionyl chloride; para toluene sulfonyl chloride; stearyl chloride; adipoyl chloride; and oxaloyl chloride. Mixtures of acid halides also can be used as desired.

The amount of phosphorus based acid employed is the amount which is effective as a bench life extender. This amount is usually about 0.05 to about 5% by weight; more preferably about 0.05 to less than 2%; and most preferably about 0.1 to about 1% based upon the weight of the binder. Where acid halides are employed in combination with the phosphorus based acids, the amount of acid halide employed is the amount which, in combination with the amount of phosphorus based acid present, is effective as a bench life extender. This amount is usually about 0.05 to about 5% by weight based upon the weight of the binder composition and preferably about 0.1 to about 2% based upon the weight of the binder.

The binder compositions which are benefited by use of this invention are known to the art and are those which contain certain phenolic resin and polyisocyanate combinations. Such phenolic/isocyanate binder systems are admixed at or about the time of use in the presence of sand. Typically, the reactive ingredients of such binder compositions are sold, shipped and stored in separate packages (i.e., a multiple package core binder) to avoid undesirable deterioration due to premature reaction between the components. Solvents, catalysts, various additives and other known binders can optionally be used in conjunction with these essential ingredients, i.e., used with the phenolic resin and the isocyanate.

The phenol reactants employed in making the phenolic resin component preferably include at least 5 mole percent and preferably about 5 to about 30 mole percent of a alkyl phenol, more preferably nonyl phenol, and most preferably paranonyl phenol. Phenolic resins from other phenols in combination with the phosphorus based acid, although exhibiting significant improvement in benchlife, do not exhibit the greatly improved benchlife achieved by the preferred phenols. The phenolic resins are substantially free of water and are organic solvent soluble. In addition to preferably containing nonyl phenol, the phenolic component includes any one or more of the phenols which have heretofore been employed in the formation of phenolic resins and which are not substituted at either the two ortho-positions or at one ortho- and the para-position, such unsubstituated positions being necessary for the polymerization reaction. Any one, all, or none of the remaining carbon atoms of the phenol ring can be substituted. The nature of the substituent can vary widely, and it is only necessary that the substituent not interfere in the polymerization of the aldehyde with the phenol at the ortho- and-/or para-positions. Substituted phenols employed in the formation of the phenolic resins include: alkyl-substituted phenols, aryl-substituted phenols, cyclo-alkyl-substituted phenols, alkenyl-substituted phenols, alkoxy-substituted phenols, aryloxy-substituted phenols, and halogen-substituted phenols, the foregoing substituents containing from 1 to 26 and preferably from 1 to 12 carbon atoms.

Specific examples of suitable phenols include: phenol, 2,6 xylenol, o-cresol, m-cresol, p-cresol, 3,5-xylenol, 3,4-xylenol, 2,3,4-trimethyl phenol, 3-ethyl phenol, 3,5-diethyl phenol, p-butyl phenol, 3,5-dibutyl phenol, p-amyl phenol, p-cyclohexyl phenol, p-octyl phenol, 3,5-dicyclohexyl phenol, p-phenyl phenol, p-crotyl phenol, 3,5-dimethoxy phenol, 3,4,5-trimethoxy phenol, p-ethoxy phenol, p-butoxy phenol, 3-methyl-4-methoxy phenol, and p-phenoxy phenol. Multiple ring phenols, such as bisphenol A, are also suitable. Such phenols can be described by the general formula:

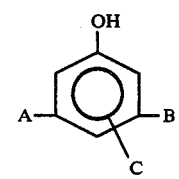

wherein A, B, and C are hydrogen atoms, or hydroxyl radicals, or hydrocarbon radicals, or oxyhydrocarbon radicals, or halogen atoms or combinations of these. The preferred phenol component employed is a mixture of one or more of these phenols with nonyl phenol.

The phenol component is preferably reacted with an aldehyde to form phenolic resins, more preferably benzylic ether resins. The aldehydes reacted with the phenol can include any of the aldehydes heretofore employed in the formation of phenolic resins such as formaldehyde, acetaldehyde, propionaldehyde, furfuraldehyde, and benzaldehyde. In general, the aldehydes employed have the formula R'CHO wherein R' is a hydrogen or a hydrocarbon radical of 1 to 8 carbon atoms. The most preferred aldehyde is formaldehyde.

A preferred class of phenolic resins that can be employed in the binder compositions of the present invention is described in U.S. Pat. No. 3,485,797 referred to above. The phenolic resins employed in the binder compositions also can include either resole or A-stage resins or novolac resins and, when admixed with polyisocyanates and a foundry aggregate and cured by use of catalysts, these resins form cores of sufficient strength and other properties to be suitable in industrial applications.

The resole resins are preferred over the novolak resins. The resitole or B-stage resins, which are a more highly polymerized form of resole resins, are generally unsuitable. The phenolic resin employed must be liquid or organic solvent-soluble. Solubility in organic solvent is desirable to achieve uniform distribution of the binder on the aggregate.

The substantial absence of water in the phenolic resin is desirable in view of the reactivity of the binder composition of the present invention with water. The term "non-aqueous" or substantially water-free as employed herein is meant to define phenolic resins which contains no more than about 10 percent (10%) water, preferably no more than about 5 percent (5%) water, and more preferably no more than about 1 percent (1%) water based on the weight of the resin. Mixtures of phenolic resins can be used.

The phenolic resin component of the binder composition is, as indicated above, generally employed as a solution in an organic solvent. The nature and the effect of the solvent will be more specifically described below. The amount of solvent used should be sufficient to result in a binder composition permitting uniform coating thereof on the aggregate and uniform reaction of the mixture. The specific solvent concentrations for the phenolic resins will vary depending on the type of phenolic resins employed and its molecular weight. In general, the solvent concentration will be in the range of up to 80 percent by weight of the resin solution and preferably in the range of 20 to 80 percent. It is preferred to keep the viscosity of the phenolic component at less than X−1 on the Gardner-Holt Scale.

The second component or package of the binder composition comprises an aliphatic, cycloaliphatic, or aromatic polyisocyanate having preferably from 2 to 5 isocyanate groups. If desired, mixtures of organic polyisocyanates can be employed. Suitable polyisocyanates include the aliphatic polyisocyanates such as hexamethylene diisocyanate, alicyclic polyisocyanates such as 4,4′-dicyclohexylmethane diisocyanate, and the dimethyl derivatives thereof. Further examples of suitable polyisocyanates are 1,5-naphthalene diisocyanate, triphenylmethane triisocyanate, xylylene diisocyanate, and the methyl derivatives thereof, polymethylenepolyphenyl isocyanates, chlorophenylene-2,4-diisocyanate, and the like. Mixtures of isocyanates can be used. Although all polyisocyanates react with the phenolic resin to form a cross-linked polymer structure, the preferred polyisocyanates are aromatic polyisocyanates and particularly diphenylmethane diisocyanate, triphenylmethane triisocyanate, and mixtures thereof.

The polyisocyanate is employed in sufficient concentrations to cause the curing of the phenolic resin. In general, the polyisocyanate will be employed in a range of 10 to 500 weight percent of polyisocyanate based on the weight of the phenolic resin. Preferably, from 20 to 300 weight percent of polyisocyanate on the same basis is employed. The polyisocyanate is employed in liquid form. Liquid polyisocyanates can be employed in undiluted form. Solid or viscous polyisocyanates are employed in the form of organic solvent solutions, the solvent being present in a range of up to 80 percent by weight of the solution. Most preferably the isocyanate is employed in a stoichiometric amount ± about 20% based on the available hydroxyl groups of the phenolic resin.

The amines employed for neutralizing the phosphorus based acids according to the present invention can be primary, secondary and tertiary alkyl, cyclo-alkyl and aromatic amines. The preferred amines are the aminosilanes, such as gamma-aminopropyl triethoxy silane and N-beta (aminoethyl)-gamma-amino-propyl-trimethoxy silane. Other suitable amines are the primary and tertiary fatty amines, the and oleic hydroxyethyl imidazolines, alkoxylated primary and secondary amines (especially the fatty primary amines), benzylmethylamine, benzyldimethylamine, and mono-, di-, and tri-ethanol amines. The amount of amine used is just about that required to neutralize the acid, or slightly less as excess amine may shorten bench life.

The difference in the polarity between the polyisocyanate and the phenolic resins restricts the choice of solvents in which both components are compatible. Such compatibility is necessary to achieve complete reaction and curing of the binder compositions of the present invention. Polar solvents of either the protic or aprotic type are good solvents for the phenolic resin, but have limited compatibility with the polyisocyanates. Aromatic solvents, although compatible with the polyisocyanates, are less compatible with the phenolic resins. The solvents selected must also be compatible with the phosphorus based acid ingredient and, if used, the acid halide ingredient. Both of these ingredients are preferably organic derivatives compatible with the polar solvents and/or aromatic solvents used for the phenolic and isocyanate components of the system. Each of these ingredients is preferably placed in the component in which it has the greatest solubility and stability.

It is therefore preferred to employ combinations of solvents and particularly combinations of aromatic and polar solvents. Suitable aromatic solvents are benzene, toluene, xylene, ethylbenzene and mixtures thereof. Preferred aromatic solvents are mixed solvents that have an aromatic content of at least 90 percent and a boiling point range of 280° to 450° F. Suitable polar solvents are generally those which have been classified in the art as coupling solvents and include furfural, furfuryl alcohol, Cellosolve acetate, butyl Cellosolve, butyl Cellosolve acetate, butyl Carbitol, diacetone alcohol, and "Texanol".

In addition, the compositions can include drying oils such as disclosed in U.S. Pat. No. 4,268,425, the entire contents of which are incorporated herein by reference. Such drying oils include glycerides of fatty acids which contain two or more double bonds whereby oxygen on exposure to air can be absorbed to give peroxides which catalyze the polymerization of the unsaturated portions. Examples of some natural drying oils include soybean oil, sunflower oil, hemp oil, linseed oil, tung oil, oiticica oil, fish oils, and dehydrated castor oil, as well as the various known modifications thereof (e.g., the heat bodied, air-blown, or oxygen-blown oils such as blown linseed oil and blown soybean oil). The above discussion concerning the oils is not intended to imply that such actually cure in the present system by air drying but is intended to help define the drying oils.

Also, esters of ethylenically unsaturated fatty acids such as tall oil esters of polyhydric alcohols such as glycerine or pentaerythritol or monohydric alcohols such as methyl and ethyl alcohols can be employed as the drying oil. If desired, mixtures of drying oils can be employed. The preferred drying oil employed in the present invention is linseed oil.

The amount of the drying oil employed is generally at least about 2%, preferably about 2% to about 15%, and most preferably about 4% to about 10% by weight based upon the total weight of the components in the binder composition. The drying oil can be considered part of the solvent component of the composition.

In addition, the solvent component can include liquid dialkyl esters such as dialkyl phthalate of the type disclosed in U.S. Pat. No. 3,905,934, the entire contents of which are incorporated herein by reference. Such preferably have the structure:

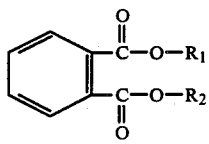

where $R_1$ and $R_2$ are alkyl radicals of 1 to 12 carbon atoms and the total number of carbon atoms in the R groups does not exceed 16. Preferably $R_1$ and $R_2$ are alkyl radicals of 3 to 6 carbon atoms and the total number of carbon atoms in $R_1$ and $R_2$ is between 6 and 12. Thus in the above structural formula, either R group can be methyl, ethyl, n-propyl, isopropyl, n-butyl, isobutyl, n-pentyl, isopentyl, hexyl, isohexyl, heptyl, isoheptyl, octyl, isooctyl, and other isomers of the foregoing.

Other dialkyl esters include dimethyl glutarate such as available from DuPont under the trade designation DBE-5; dimethyl adipate available from DuPont under the trade designation DBE-6, dimethyl succinate; and mixtures of such esters which are available from DuPont under the trade designation DBE, and dialkyl adipates and succinates with alcohols up to 12 carbon atoms.

Although three-package systems are contemplated, the binder compositions are preferably to be made available as a two-package system with the phenolic resin in one package and the isocyanate component in the other package with the drying oil. The binder components can be combined and then admixed with sand or a similar aggregate to form the molding mix or the mix can also be formed by sequentially admixing the components with the aggregate. Methods of distributing the binder on the aggregate particles are well known to those skilled in the art. The mix can, optionally, contain other ingredients such as iron oxide, ground flax fibers, wood cereals, pitch, refractory flours, and the like.

When preparing an ordinary sand type foundry shape, the aggregate employed has a particle size large enough to provide sufficient porosity in the foundry shape to permit escape of volatiles from the shape during the casting operation. The term "ordinary sand type foundry shapes" as used herein refers to foundry shapes which have sufficient porosity to permit escape of volatiles from it during the casting operation. Generally, at least about 80% and preferably about 90% by weight of aggregate employed for foundry shapes has an average particle size no larger than about 50 mesh (Tyler Screen Mesh). The aggregate for foundry shapes preferably has an average particle size between about 50 and about 150 mesh (Tyler Screen Mesh). The preferred aggregate employed for ordinary foundry shapes is sand wherein at least about 70 weight percent and preferably at least about 85 weight percent of the sand is silica. Other suitable aggregate materials include zircon, olivine, aluminosilicate sand, chromite sand and the like.

When preparing a shape for precision casting, the predominant portion and generally at least about 80% of the aggregate has an average particle size no larger than 150 mesh (Tyler Screen Mesh) and preferably between about 325 mesh and 200 mesh (Tyler Screen Mesh). Preferably at least about 90% by weight of the aggregate for precision casting applications has a particle size no larger than 150 mesh and preferably between 325 mesh and 200 mesh. The preferred aggregates employed for precision casting applications are fused quartz, zircon sands, magnesium silicate sands such as olivine, and aluminosilicate sands.

When preparing a refractory such as a ceramic, the predominant portion and at least 80 weight percent of the aggregate employed has an average particle size under 200 mesh and preferably larger than 325 mesh. Preferably at least about 90% by weight of the aggregate for a refractory has an average particle size under 200 mesh and preferably larger than 325 mesh. The aggregate employed in the preparation of refractories must be capable of withstanding the curing temperatures such as above about 1,500° F. which are needed to cause sintering for utilization. Examples of some suitable aggregates employed for preparing refractories include the ceramics such as refractory oxides, carbides, nitrides, and silicides such as a aluminum oxide, lead oxide, chromic oxide, zirconium oxide, silica, silicon carbide, titanium nitride, boron nitride, molybdenum disilicide, and carbonaceous material such as graphite. Mixtures of the aggregate can also be used, when desired, including mixtures of metals and the ceramics.

Examples of some abrasive grains for preparing abrasive articles include aluminum oxide, silicon carbide, boron carbide, corundum, garnet, emery and mixtures thereof. The grit size is of the usual grades as graded by the United States Bureau of Standards. These abrasive materials and their uses for particular jobs are understood by persons skilled in the art and are not altered in the abrasive articles contemplated by the present invention. In addition, inorganic filler can be employed along with the abrasive grit in preparing abrasive articles. It is preferred that at least about 85% of the inorganic filler has an average particle size no greater than 200 mesh. It is most preferred that at least about 95% of the inorganic filler has an average particle size no greater than 200 mesh. Some inorganic fillers include cryolite, fluorospar, silica and the like. When an inorganic filler is employed along with the abrasive grit, it is generally present in amounts from about 1 to about 30% by weight based upon the combined weight of the abrasive grit and inorganic filler.

Although the aggregate employed is preferably dry, it can contain small amounts of moisture, such as up to about 0.3% by weight or even higher based on the weight of the aggregate.

In molding compositions, the aggregate constitutes the major constituent and the binder constitutes a relatively minor amount. In ordinary sand type foundry applications, the amount of binder is generally no greater than about 10% by weight and frequently within the range of about 0.5 to about 7% by weight based upon the weight of the aggregate. Most often, the binder content ranges from about 0.6 to about 5% by weight based upon the weight of the aggregate in ordinary sand type foundry shapes. For casting of low melting point metals where shake-out and collapsibility are important, about 0.6 to about 1.5% by weight based upon the weight of the aggregate in ordinary sand type foundry shapes is preferably used.

In molds and cores for precision casting applications, the amount of binder is generally no greater than about 40% by weight and frequently within the range of about 5 to about 20% by weight based upon the weight of the aggregate.

In refractories, the amount of binder is generally no greater than about 40% by weight and frequently within the range of about 5% to about 20% by weight based upon the weight of the aggregate.

In abrasive articles, the amount of binder is generally no greater than about 25% by weight and frequently within the range of about 5% to about 15% by weight based upon the weight of the abrasive material or grit.

Although the aggregate employed is preferably dry, moisture of up to about 1 weight percent based on the weight of the aggregate can be tolerated. This is particularly true if the solvent employed is non-water-miscible or if an excess of the polyisocyanate necessary for curing is employed, since such excess polyisocyanate will react with the water.

The molding mix is molded into the desired shape, whereupon it can be cured so as to retain this shape upon removal from the mold. Curing can be affected by passing a tertiary amine, such as triethylamine or dimethylethyl amine, through the molded mix as described in U.S. Pat. No. 3,409,579.

A valuable additive to the binder compositions of the present invention in certain types of sand is a silane such as those having the general formula:

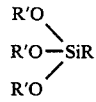

wherein R' is a hydrocarbon radical and preferably an alkyl radical of 1 to 6 carbon atoms and R is an alkyl radical, an alkoxy-substituted alkyl radical, or an alkyl-amine-substituted alkyl radical in which the alkyl groups have from 1 to 6 carbon atoms. The aforesaid silane, when employed in concentrations of 0.1 to 2% by weight based on weight of the phenolic binder and hardener, improves the humidity resistance of the systems. Examples of some commercially available silanes are Dow Corning Z6040 and Union Carbide A-187 (gamma glycidoxy propyltrimethoxy silane); Union Carbide A-1100 (gamma aminopropyltriethoxy silane); Union Carbide A-1120 (N-beta (aminoethyl)-gamma-amino-propyltrimethoxy silane); and Union Carbide A-1160 (Ureido-silane).

Other valuable additives are internal release agents such as fatty acids, fatty alcohols and/or derivatives of these materials and silicone materials such as dimethyl-, methylphenyl-, and diphenylpolysiloxanes. A suitable fatty acid is sylfat 96 (from Sylvachem Corp.) which is based on oleic and linoeic acids.

In order to further understand the present invention, the followng non-limiting examples concerned with foundry shapes are provided. All parts are by weight unless the contrary is stated. In all examples, the tensile strength samples are cured by the so-called "cold-box" process by contacting with dimethylethylamine.

EXAMPLE 1

The following is a typical procedure which can be employed to prepare phenolic resins suitable for use in accordance with the present invention.

Charge about 858.15 grams of phenol, about 223.25 grams of nonyl phenol containing at least about 90% by weight of para-nonyl phenol, about 418.05 grams of 91% para-formaldehyde, and about 0.6 grams of zinc acetate to a reaction vessel provided with a stirrer, thermometer and condenser. Instead of the zinc acetate catalyst, other metal catalysts as disclosed in U.S. Pat. No. 3,485,797 such as lead soaps of $C_9$–$C_{12}$ monocarboxylic acids; lead naphthenate and lead octoate may be employed. Heat the reaction mass up to about 112° to about 114° C. Hold at that temperature under reflux condition until the free formaldehyde is less than about 8%. This usually takes about one and one-half hours.

Heat under atmospheric dehydration conditions to about 125° C. until substantially all of the free formaldehyde has reacted (less than about 1% free formaldehyde). Then dehydrate under vacuum of 27" of Hg for about 10 minutes to obtain about 1286.9 grams of the desired product.

EXAMPLE 2

100 parts by weight of Martin Marietta Sand (20KK) are admixed for about 2 minutes with about 0.825 parts of a phenolic resin composition containing about 51% by weight of a phenolic resin prepared along the lines of Example 1; about 14% by weight of TXIB(2,2,4-trimethyl-1,3-pentanediol diisobutyrate); about 22.2% by weight of Texaco 7545 solvent (an aromatic solvent having an initial boiling point (IBP) about 440° F., 10% at about 490° F., 50% at about 510° F., 90% at about 600° F., and dry end point of about 700° F.); about 5% of HiSol 15 (an aromatic solvent available from Ashland Chemical Company having a boiling point range of 182°–204° C.); about 4.4% by weight of linseed oil; and about 3.4% by weight of T-1215 (polymerized linseed oil available from Spencer Kellogg). About 0.5 parts of an 83% hypophosphorous acid solution per 100 parts of phenolic resin composition are admixed with the phenolic component until homogenous prior to admixture with the sand. To the sand mixture are admixed for about 2 minutes about 0.675 parts of isocyanate composition containing 75.2 parts by weight of Mondur MR (an aromatic polyisocyanate based on polymethylene polyphenyl isocyanate) from Mobay, about 9.2 parts by weight of Texaco 7545 solvent, about 9 parts of HiSol 15 and about 6 parts of kerosene.

The foundry mix is aged under ambient conditions for 4 hours (bench life). After this, the resulting foundry mix is shaped by blowing it into a core box and contacting it with dimethylethylamine, thereby forming AFS tensile strength samples (dog bones) using the standard procedure.

The cured samples are tested for tensile strength. The average immediate tensile strength of this composition, which was aged for 4 hours under ambient conditions before curing, is about 125 psi, and the average 24 hour tensile strength is about 245 psi.

EXAMPLE 3

Example 2 is repeated except 0.4 parts of 83% hypophosphorous acid solution are admixed per 100 parts of the phenolic resin component. After the foundry mix is aged for 4 hours under ambient conditions and then cured, the average immediate tensile strength is about 123 psi and the average 24 hour tensile strength is about 243 psi.

EXAMPLE 4

Example 2 is repeated with 0.25 parts of 83% hypophosphorous acid admixed per 100 parts of the phenolic resin component. After the foundry mix is aged 4 hours under ambient conditions and then cured, the average immediate tensile strength is about 123 psi and the average 24 hour tensile strength is about 213 psi.

EXAMPLE 5

Example 2 is repeated with 0.1 parts of 83% hypophosphorous acid admixed per 100 parts of the phenolic resin component. After the foundry mix is aged 4 hours under ambient conditions and then cured, the average immediate tensile strength is about 118 psi and the average 24 hour tensile strength is about 205 psi.

EXAMPLE 6

As a control, Example 2 is repeated without the addition of 83% hypophosphorous acid. After the foundry mix is aged 4 hours under ambient conditions and then cured, the average immediate tensile strength is about 78 psi and the average 24 hour tensile strength is about 122 psi.

EXAMPLE 7

Example 2 is repeated except the phenolic resin composition contains about 52 parts by weight of the phenolic resin, about 14 parts of TXIB, about 22 parts by weight of Texaco 7545, about 5.4 parts of HiSol 15, about 1.6 parts by weight of linseed oil, about 3.4 parts of the polymerized linseed oil, about 0.3 parts by weight of a silicone fluid (polymethylphenyl siloxane), about 0.8 parts of a fatty acid (Sylfat 96), about 0.4 parts of 83% hypophosphorous acid and about 0.3 parts by weight of silane 1102 (Union Carbide). After the foundry mix is aged 5 hours under ambient conditions and then cured, the average immediate tensile strength is about 123 psi and the average 24 hour tensile strength is about 210 psi.

EXAMPLE 8

Example 7 is repeated except the phenolic resin composition contains 0.2 parts by weight of 83% hypophosphorous acid and the isocyanate solution contains 0.6 parts by weight of phthaloyl chloride. After the foundry mix is aged 5 hours under ambient conditions and then cured, the average immediate tensile strength is about 127 psi and the average 24 hour tensile strength is about 238 psi.

EXAMPLES 9-12

Example 2 is repeated except the phenolic resin composition contains 53.6 parts by weight of the phenolic resin, 14 parts TXIB, 21.8–22.2 parts by weight of Texaco 7545, 5.4 parts HiSol 15, 3.4 parts polymerized linseed oil, 0.8 parts of the fatty acid, 0.3 parts of the silicone fluid, 0.2 parts by weight of 95% hypophosphorous acid solution and an amine as specified below. The isocyanate solution contains 0.6 parts by weight of phthaloyl chloride. The average immediate and 24 hour tensile strengths after the foundry mixes are aged 5 hours under ambient conditions and cured are as follows:

| Example | Amine (parts) | Immediate Tensiles (psi) | 24-Hour Tensiles (psi) |
|---|---|---|---|
| 9 | Monoethanolamine (0.15) | 133 | 248 |
| 10 | Benzylmethylamine (0.3) | 130 | 253 |
| 11 | Benzyldimethylamine (0.3) | 125 | 227 |
| 12 | 4-phenylpropylpyridine (0.45) | 115 | 233 |

EXAMPLES 13-22

100 parts by weight of Martin Marietta sand (20KK) are admixed for about 2 minutes with about 0.825 parts of a phenolic resin composition containing about 51% by weight of a phenolic resin prepared along the lines of Example 1; about 14% by weight of TXIB; about 22.2% of Texaco 7545 solvent; about 5% by weight of HiSol 15; about 4.4% linseed oil; and about 3.4% by weight polymerized linseed oil. To this mixture are admixed for about 2 minutes 0.675 parts of an isocyanate composition containing about 75.2% by weight of Mondur MR; about 9% of HiSol 15; about 6% by weight of kerosene; and about 9.8% of a variable mixture based on Texaco 7545, phthaloyl chloride and PA-75 (a 75% by weight solution of monophenyl and diphenyl acid phosphates in butanol from Mobay Chemical, the ingredients of this mixture being varied as described below. After these foundry mixes are aged 5 hours under ambient conditions and then cured, the average immediate and 24 hour tensile strengths are as follows:

| Example | 13 | 14 | 15 | 16 | 17 |
|---|---|---|---|---|---|
| Texaco 7545 (%) | 8.2 | 8.4 | 8.6 | 8.8 | 8.2 |
| phthaloyl chloride (%) | 1.0 | 0.8 | 0.6 | 0.4 | 1.2 |
| PA-75 (%) | 0.6 | 0.6 | 0.6 | 0.6 | 0.4 |
| Immediate (psi) | 135 | 128 | 120 | 118 | 113 |
| 24-hour (psi) | 273 | 252 | 247 | 235 | 243 |

| Example | 18 | 19 | 20 | 21 | 22 |
|---|---|---|---|---|---|
| Texaco 7545 (%) | 8.4 | 8.6 | 8.8 | 9.0 | 9.2 |
| phthaloyl chloride (%) | 1.0 | 0.8 | 0.6 | 0.4 | 0.2 |
| PA-75 (%) | 0.4 | 0.4 | 0.4 | 0.4 | 0.4 |
| Immediate (psi) | 120 | 102 | 102 | 100 | 100 |
| 24-hour (psi) | 247 | 220 | 207 | 197 | 190 |

EXAMPLE 23

The following example illustrates the use of a 3-component binder system. The phenolic resin component contains about 53.6 parts of the resin prepared along the lines of Example 1, about 12 parts of TXIB, about 5 parts of HiSol 15 and about 21 parts of Texaco 7545 solvent. The isocyanate component contains about 75.2 parts Mondur MR, about 9.0 parts HiSol 15, about 9.2 parts Texaco 7545 solvent, about 6.0 parts kerosene and about 0.6 parts phthaloyl chloride. The third component contains about 3.4 parts of the polymerized linseed oil, about 0.8 parts of Sylfat 96, about 0.3 parts of a methylphenyl polysiloxane fluid, about 2.0 parts TXIB, about 1.0 parts Texaco 7545 solvent and about 0.6 parts PA-75. 91.6 parts of the phenolic resin component are mixed with 8.1 parts of the third component before usage. 100 parts by weight of Martin Marietta 20KK sand is admixed for about 2 minutes with about 0.825 parts of the phenolic resin component and third component blend. The sand mix is then admixed for about 2 minutes with about 0.675 parts of the isocyanate component. After the sand mix composition is aged for 5 hours under ambient conditions and then cured, the average immediate tensile strength is about 88 psi and the average 24 hour tensile strength is about 213 psi.

EXAMPLE 24

Example 23 is repeated except the 0.6 parts of PA-75 in the third component is replaced with about 0.2 parts of a 95% hypophosphorous acid solution and about 0.3 parts of benzyl methylamine. After the sand mix composition is aged for 5 hours under ambient conditions and then cured, the average immediate tensile strength is about 130 psi and the average 24 hours tensile strength is about 232 psi.

All of the above examples illustrate tensile strength obtained under conditions which are considered acceptable for practical foundry core and mold making applications.

EXAMPLE 25

100 parts by weight of Martin Marietta 20 KK sand are admixed for 12 minutes with about 0.825 parts of a phenolic resin solution containing about 47.87 parts of a resin prepared from phenol and 91% paraformaldehyde according to the procedure described in Example 1, about 9.43 parts of Texaco 7545, 31.21 parts of diisobutyl phthalate, about 5.2 parts of HiSol 10 (an aromatic solvent available from Ashland Chemical having a boiling point range of from 157° to 177° C.), about 5.2 parts kerosene, and about 1 part Sylfat 96. To this mixture are admixed for 2 minutes 0.675 parts of an isocyanate solution containing about 73 parts Mondus MR, about 18.8 parts Texaco 7545 solvent, about 7 parts kerosene, about 0.6 parts phthaloyl chloride and about 0.6 parts PA-75. After this sand mix composition is aged for 4 hours under ambient conditions and then cured, the average immediate tensile strength is 112 psi and the 24 hour tensile strength is 170 psi.

EXAMPLE 26

Example 25 is repeated using an isocyanate solution without PA-75. After the sand mix composition is aged for 4 hours under ambient conditions and then cured, the average immediate tensile strength is 67 psi and the 24 hour tensile strength is 148 psi.

What is claimed is:

1. A binder composition provided by mixing and reacting a separately prepared resin component with a hardener component in the presence of a phosphorus based acid having at least one free hydroxyl group attached to the phosphorus atom, said separately prepared resin component including aphenolic resin which comprises reaction products of reacting an aldehyde with a phenol at the two ortho-positions or at one ortho- and the para-position such that said separately prepared resin component contains substantially all of the phenolic hydroxyl groups of said phenol; said phenol having the general formula:

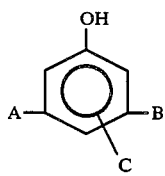

wherein A, B and C are hydrogen atoms, or hydroxyl radicals, or hydrocarbon radicals, or halogen atoms, or combinations of these; said aldehyde having the general formula R'CHO, wherein R' is a hydrogen or a hydrocarbon radical of 1 to 8 carbon atoms; said hardener component comprising a liquid polyisocyanate containing at least two isocyanate groups; said binder composition being immediately curable at room temperature by a separate amine catalyst component; and the amount of said phosphorus based acid being sufficient to extend the bench life of said binder composition in the absence of said catalyst component.

2. The binder composition of claim 1 wherein said phosphorus based acid is orthophosphoric, hypophosphoric, metaphosphoric, pyrophosphoric or polyphosphoric acid, or phosphorous, hypophosphorous or pyrophosphorous acid, or a mixture thereof.

3. The binder composition of claim 1 wherein said phosphorus based acid is orthophosphoric acid.

4. The binder composition of claim 1 wherein said phosphorus based acid is hypophosphorous acid.

5. The binder composition of claim 1 wherein said phosphorus based acid is phosphorous acid.

6. The binder composition of claim 1 wherein said phosphorus based acid is pyrophosphoric acid.

7. The binder composition of claim 1 wherein said phosphorus based acid is hypophosphoric, metaphosphoric, pyrophosphorous, or polyphosphoric acid.

8. The binder composition of claim 1 wherein said phosphorus based acid is an organic derivative of phosphoric, hypophosphoric, metaphosphoric, pyrophosphoric, polyphosphoric, phosphorous, hypophosphorous or pyrophosphorous acid other than completely esterified derivatives which have no free hydroxyl group attached to the phosphorus atom, or a mixture thereof.

9. The binder composition of claim 8 in which said organic derivative is a partial ester of orthophosphoric or pyrophosphoric acid, or a mixture of said partial esters.

10. The binder composition of claim 9 in which said partial ester is monophenyl or diphenyl acid phosphate, monobutyl or dibutyl acid phosphate, monoisooctyl or diisooctyl acid phosphate, mono(2-ethylhexyl) or di(2-ethylhexyl) acid phosphate, or bis(2-ethylhexyl) pyrophosphoric acid, or a mixture thereof.

11. The binder composition of claim 1 wherein said phosphorus based acid is employed in amounts of about 0.05% to about 5% by weight of the composition.

12. The binder composition of claim 1 wherein said phosphorus based acid is employed in amounts of about 0.1% to about 2% by weight of the composition.

13. The binder composition of claim 1 in which said phenol is an alkyl phenol.

14. The binder composition of claim 13 wherein said alkyl phenol is nonyl phenol.

15. The binder composition of claim 14 wherein said resin component includes phenolic resins made from a plurality of phenol reactants and the amount of the nonyl phenol is about 5 to about 30 mole percent based on the total moles of said phenol reactants.

16. The binder composition of claim 15 wherein the amount of the nonyl phenol is about 10 mole percent.

17. The binder composition of claim 1 provided by carrying out said reaction in the presence of both said phosphorus based acid and an acid halide.

18. The binder composition of claim 17 in which said acid halide is hydrochloric acid or phthaloyl chloride.

19. The binder composition of claim 17 in which said acid halide is employed in amounts of about 0.05% to about 5% by weight of the composition.

20. The binder composition of claim 17 in which said acid halide is employed in amounts of about 0.1% to about 2% by weight of the composition.

21. A molding composition which comprises:
A. a major amount of aggregate; and
B. an effective bonding amount up to about 40% by weight of the aggregate of the binder composition of claim 1.

22. The molding composition of claim 21 wherein the amount of said binder composition is about 0.6 to about 5% based upon the weight of the aggregate.

23. The molding composition of claim 21 in which said composition is cured by an amine gas.

24. A molding composition which comprises:
A. a major amount of aggregate; and
B. an effective bonding amount up to about 40% by weight of the aggregate of the binder composition of claim 17.

25. The molding composition of claim 24 wherein the amount of said binder composition is about 0.6 to about 5% based upon the weight of the aggregate.

26. The molding composition of claim 24 in which said composition is cured by an amine gas.

27. A process for the fabrication of a foundry shape which comprises:
A. mixing foundry aggregate with a bonding amount of up to about 10% by weight based upon the weight of the aggregate of the binder composition of claim 1;
B. introducing the foundry mix obtained from step (A) into a pattern;
C. hardening the foundry mix in the pattern to become a self-supporting shape; and
D. thereafter removing the shaped foundry mix of step (C) from the pattern and allowing it to further cure, thereby obtaining a hard, solid, cured foundry shape.

28. The process of claim 27 wherein the amount of said binder composition is about 0.6 to about 5% based upon the weight of aggregate.

29. The process of claim 27 wherein said foundry mix is hardened by contacting the foundry mix with an amine gas in a cold box process.

30. A process for the fabrication of a foundry shape which comprises:
A. mixing foundry aggregate with a bonding amount of up to about 10% by weight based upon the weight of the aggregate of the binder composition of claim 17;
B. introducing the foundry mix obtained from step (A) into a pattern;
C. hardening the foundry mix in the pattern to become a self-supporting shape; and
D. thereafter removing the shaped foundry mix of step (C) from the pattern and allowing it to further cure, thereby obtaining a hard, solid, cured foundry shape.

31. The process of claim 30 wherein the amount of said binder composition is about 0.6 to about 5% based upon the weight of aggregate.

32. The process of claim 30 wherein said foundry mix is hardened by contacting the foundry mix with an amine gas in a cold box process.

33. The process of casting a metal which comprises:
A. fabricating a shape in accordance with claim 27;
B. pouring said metal while in the liquid state into or around said shape;
C. allowing said metal to cool and solidify; and
D. then separating the molded article.

34. The process of casting a metal which comprises:
A. fabricating a shape in accordance with claim 30;
B. pouring said metal while in the liquid state into or around said shape;
C. allowing said metal to cool and solidify; and
D. then separating the molded article.

35. The binder composition of claim 1 which further includes a silane.

36. The binder composition of claim 1 which further includes a base.

37. The binder composition of claim 36 in which said base is an amine.

38. The binder composition of claim 37 in which the amine is an aminosilane.

39. The binder composition of claim 37 in which the amine is an alkyl or cyclic aliphatic amine.

40. The binder composition of claim 37 in which the amine is an aromatic amine.

41. The binder composition of claim 1 which further contains a drying oil.

42. The binder composition of claim 1 in which said resin component includes a benzylic ether resin.

43. The binder composition of claim 17 in which said resin component includes a benzylic ether resin.

44. The molding composition of claim 21 in which said resin component of the binder composition of claim 1 includes a benzylic ether resin.

45. The molding composition of claim 24 in which the resin component of the binder composition of claim 17 includes a benzylic ether resin.

46. The process of claim 27 in which said resin component of the binder composition of claim 1 includes a benzylic ether resin.

47. The process of claim 30 in which said resin component of the binder composition of claim 17 includes a benzylic ether resin.

48. The molding composition of claim 21 which comprises a foundry mix.

49. The molding composition of claim 48 in which said aggregate comprises sand.

50. The molding composition of claim 24 which comprises a foundry mix.

51. The molding composition of claim 50 in which said aggregate comprises sand.

52. A binder composition provided by mixing and reacting a separately prepared resin component with a hardener component in the presence of an inorganic phosphorus based acid having at least one free hydroxyl group attached to the phosphorus atom, said separately prepared resin component including a phenolic resin which comprises reaction products of reacting an aldehyde with a phenol at the two ortho-positions or at one ortho- and the para-position such that said separately prepared resin component contains substantially all of the phenolic hydroxyl groups of said phenol; said phenol having the general formula:

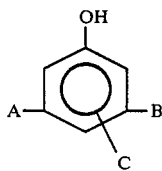

wherein A, B and C are hydrogen atoms, or hydroxyl radicals, or hydrocarbon radicals, or halogen atoms, or combinations of these; said aldehyde having the general formula R'CHO, wherein R' is a hydrogen or a hydrocarbon radical of 1 to 8 carbon atoms; said hardener component comprising a liquid polyisocyanate containing at least two isocyanate groups; said binder composition being immediately curable at room temperature by a separate amine catalyst component; and the amount of said inorganic phosphorus based acid being sufficient to extend the bench life of said binder composition in the absence of said catalyst component.

53. A binder composition provided by mixing and reacting a separately prepared resin component with a hardener component in the presence of a phosphorus based acid having at least one free hydroxyl group attached to the phosphorus atom and a base, said separately prepared resin component including a phenolic resin which comprises reaction products of reacting an aldehyde with a phenol at the two ortho-positions or at one ortho- and the para-position such that said separately prepared resin component contains substantially all of the phenolic hydroxyl groups of said phenol; said phenol having the general formula:

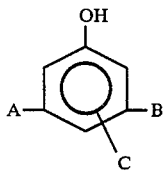

wherein A, B and C are hydrogen atoms, or hydroxyl radicals, or hydrocarbon radicals, or halogen atoms, or combinations of these; said aldehyde having the general formula R'CHO, wherein R' is a hydrogen or a hydrocarbon radical of 1 to 8 carbon atoms; said hardener component comprising a liquid polyisocyanate containing at least two isocyanate groups; said binder composition being immediately curable at room temperature by a separate amine catalyst component; the amount of said phosphorus based acid being sufficient to extend the bench life of said binder composition in the absence of said catalyst component; and the amount of said base being sufficient to substantially neutralize said phosphorus based acid.

54. A binder composition provided by mixing and reacting a separately prepared resin component with a hardener component in the presence of a phosphorus based acid having at least one free hydroxyl group attached to the phosphorus atom and a silane, said separately prepared resin component including a phenolic resin which comprises reaction products of reacting an aldehyde with a phenol at the two ortho-positions or at one ortho- and the para-position such that said separately prepared resin component contains substantially all of the phenolic hydroxyl groups of said phenol; said phenol having the general formula:

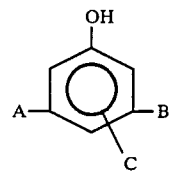

wherein A, B and C are hydrogen atoms, or hydroxyl radicals, or hydrocarbon radicals, or halogen atoms, or combinations of these; said aldehyde having the general formula R'CHO, wherein R' is a hydrogen or a hydrocarbon radical of 1 to 8 carbon atoms; said hardener component comprising a liquid polyisocyanate containing at least two isocyanate groups; said binder composition being immediately curable at room temperature by a separate amine catalyst component; the amount of said phosphorus based acid being sufficient to extend the bench life of said binder composition in the absence of said catalyst component; and the amount of said silane being sufficient to improve the humidity resistance of said binder composition.

55. The binder composition of claim 54 in which said silane is an aminosilane and the amount of said aminosilane is sufficient to substantially neutralize said phosphorus based acid.

56. The binder composition of claim 1 in which said liquid polyisocyanate is present in said hardener component in an amount of about 80% to about 120% of the stoichiometric amount based on the available hydroxyl groups of said phenolic resin.

57. The binder composition of claim 1 wherein said reaction products include condensation products with two or more benzene rings.

* * * * *